July 26, 1949.  E. A. ROCKWELL  2,477,089
MASTER CYLINDER APPARATUS
Original Filed June 4, 1943  2 Sheets-Sheet 1
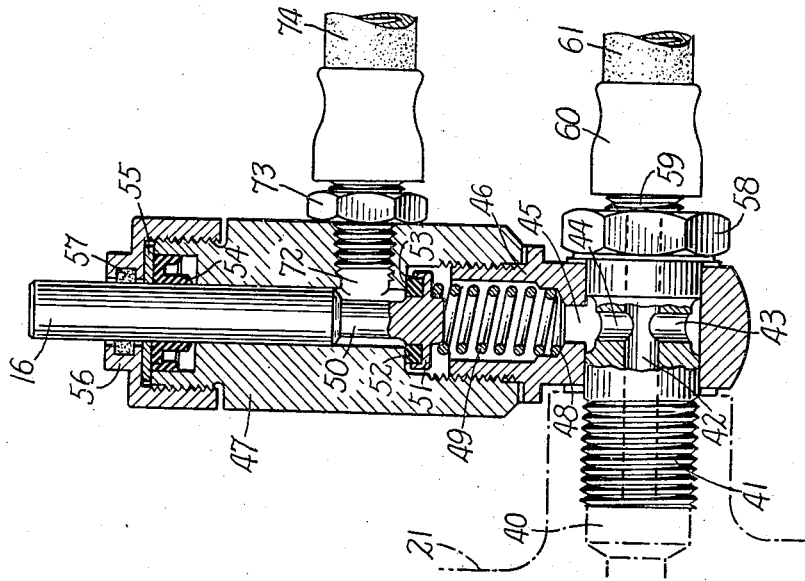
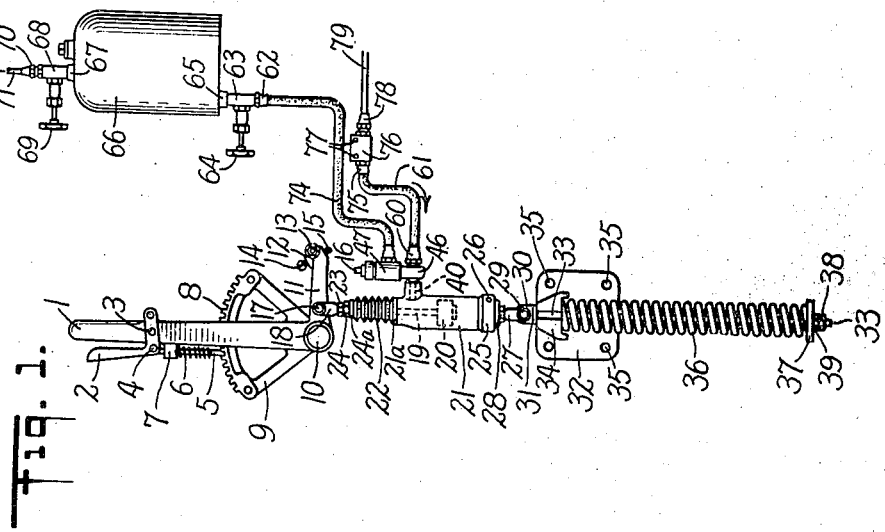
INVENTOR
Edward A. Rockwell
BY
ATTORNEY July 26, 1949.  E. A. ROCKWELL  2,477,089
MASTER CYLINDER APPARATUS
Original Filed June 4, 1943  2 Sheets-Sheet 2
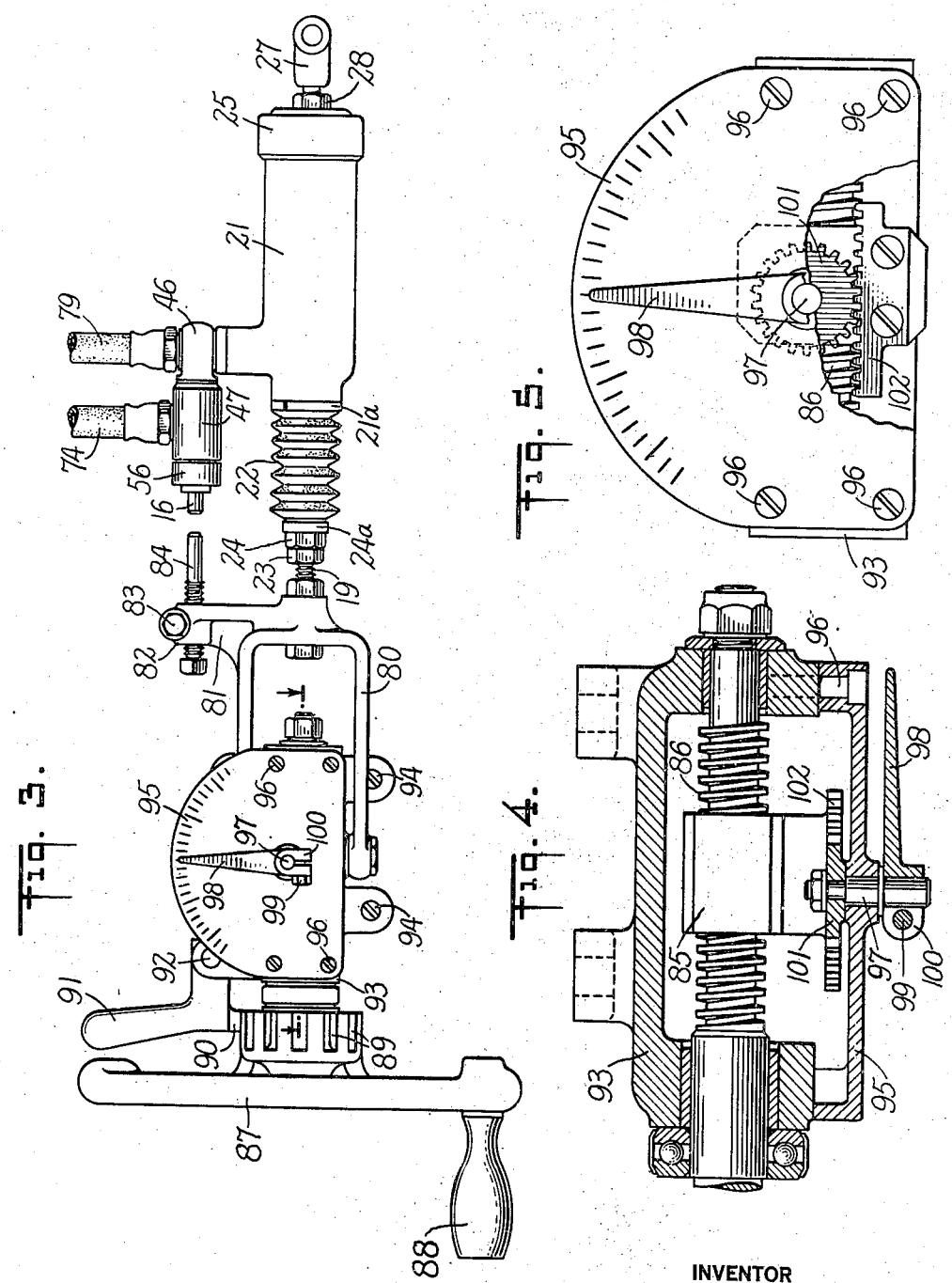
INVENTOR
Edward A. Rockwell
BY
Arthur Wright
ATTORNEY Patented July 26, 1949

2,477,089

UNITED STATES PATENT OFFICE 2,477,089

MASTER CYLINDER APPARATUS

Edward A. Rockwell, Cleveland, Ohio

Original application June 4, 1943, Serial No. 489,712, now Patent No. 2,448,465, dated August 31, 1948. Divided and this application January 24, 1945, Serial No. 574,324

8 Claims. (Cl. 60—54.6)

My invention relates particularly to master cylinders which are adapted to be used in connection with any desired hydraulic devices, but which is especially desirable in connection with the operation of locomotive reverse gears.

This application is a division of my copending application on "Locomotive reverse gear apparatus," Serial No. 489,712, filed June 4, 1943, and issued as Patent No. 2,448,465 on August 31, 1948.

The object of my invention is to provide a master cylinder apparatus which is adapted to provide any desired pressure for the operation of any devices hydraulically in an advantageous manner. Another object is to provide a master cylinder, the movement of which can be carried out without the risk of breakages. Another object is to provide an apparatus of this kind by means of which undue acceleration from the manual operation is avoidable. A further object is to provide means for locking the parts in the position of travel thus attained, irrespective of whether the same has been moved forwardly or rearwardly, thus enabling the said devices to be operated in any given predetermined position. Further objects of my invention will appear from the detailed description of the same hereinafter.

While my invention is capable of being carried out in many different ways, for the purpose of illustration I have shown only certain forms of apparatus embodying the same in the accompanying drawings, in which—

Fig. 1 is an elevation of a master cylinder construction adapted to be made in accordance with my invention, the same being especially useful in operating locomotive reverse gears;

Fig. 2 is a vertical section of the valve used for delivering the hydraulic liquid under pressure to the controlling mechanism;

Fig. 3 is a side elevation of a modified form of manual means for operating the master cylinder;

Fig. 4 is a section showing the indicator illustrated in Fig. 3; and

Fig. 5 is an elevation showing the indicator operating mechanism of Fig. 3.

Referring to the construction shown in the drawings, I have provided an operating handle 1 which may be located in the cab of a locomotive, the same being provided with a subsidiary hand lever 2 pivoted at 3 on the handle 1 and having a pivot 4 connecting it to a rod 5 normally pressed downwardly by a coil spring 6 supported on a lug 7 on the handle 1. The rod 5 acts as a pawl to engage a rack 8 on a sector 9 carried in fixed position at any point in the locomotive cab. The sector 9 has a pivot pin 10 supporting the hand lever 1. Furthermore, the hand lever 1 has an arm 11 provided with a split end 12 adapted to be tightened by a nut 13 so as to lock in place a screw 14 in the end of the arm 11. The screw 14 has an adjustable protruding end 15 which is adapted, in its end position, to contact with the top of a valve rod 16, as hereinafter referred to, for liquid compensation.

The arm 11, furthermore, has a pivot pin 17 intermediate its ends to which there is connected a yoke 18 on a piston rod 19 having a piston 20 operating in a master cylinder 21. The master cylinder 21 is closed at the top by a screw ring cap 21a and has a rubber boot 22 between the upper portion thereof and the piston rod 19, nuts 23 and 24 being provided to attach the boot 22 to the rod 19 by means of a screw-threaded sleeve 24a. The lower end of the master cylinder 21 is provided with a screw cap 25 having an air vent 26, and said cap 25 is screw-threaded to a yoke 27 with the aid of a lock nut 28. Said yoke 27, furthermore, has a pivot pin 29 connecting it to a plate 30 in said yoke having a stop flange 31 overyling a fixed bracket 32, the plate 30 being connected to a spring retaining rod 33 slidable in a projection 34 on the fixed bracket 32, having holes 35 for securing the fixed bracket 32 on any desired support in the cab of the locomotive. Around the rod 33 there is a coil spring 36 which is supported by a washer 37 and nuts 38 and 39 on the lower end of the rod 33 so as to permit the reciprocable cylinder 21 to yield to avoid breakage from the backing up of pressure due to any unusual causes or conditions in the delivered pressure liquid during work performance.

At its upper end the master cylinder 21 has a lateral passageway 40 in which there is screw-threaded a pipe 41 having a longitudinal passageway 42 and transverse apertures 43 and 44 to connect with a longitudinal passageway 45 in a fitting 46 through which the pipe 41 passes. The fitting 46 is screw-threaded to a valve casing 47 and has therein a shoulder 48 for supporting a spring 49 which bears at its upper end against a valve 51 containing an annular rubber valve member 52 which seats against a shoulder 53 on the valve casing 47. A valve stem 50 is connected to the valve rod 16, and the said rod 16 passes out of the valve casing 47 through a rubber seal 54 held in place by a washer 55 and a screw cap 56 provided with a packing 57. On the outer end of the pipe 41 there is a nut 58 to hold the valve casing 47 in place, and adjacent to the same there is a screw-thread 59 to receive a nipple 60 having thereon a rubber pipe 61.

A reservoir pipe fitting 62 is provided on a hand valve casing 63 provided with a hand valve 64 for shutting off the liquid in the pipe 61 when desired. This hand valve casing 63 is screwed into an outlet opening 65 in the bottom of a reservoir 66 adapted to be filled with hydraulic liquid, oil, or any other suitable liquid, to be placed under pressure at the top of the reservoir 66 by compressed air supplied through an inlet opening 67 having a hand valve casing 68 containing a hand valve 69 for cutting off the compressed air when desired. The hand valve casing 68 carries a screw fitting 70 connected to a compressed air supply pipe 71 adapted to be provided from any suitable source, as, for example, the usual compressed air line of a locomotive. Above the valve 52, 53 there is a port 72, controlled by said valve, containing a screw fitting 73 which is connected to a rubber pipe 74, the other end of which is connected to the pipe fitting 63.

A screw fitting 75, located in a supporting pipe bracket 76, having holes 77 for attachment of the same in a fixed position to some part of the cab, is connected to the rubber pipe 61. The bracket 76, furthermore, has a screw fitting 78 for connecting it to a pressure liquid pipe 79.

In Figs. 3 to 5 I have shown a modified form of the manual operating mechanism for operating the piston rod 19 and the master cylinder 21, the parts connected thereto, except the manual means, being just the same as previously described in connection with Fig. 1. For this purpose there is attached to the piston rod 19 a U-shaped bracket 80 having an arm 81 with a split end 82 provided with a tightening screw 83 in which there is a screw-threaded pin 84 for cooperating with the valve rod 16 for equalizing or compensating the liquid at the end of the forward position of the hand lever 1. The U-shaped bracket 80 has provided therein a screw block 85 through which there is adapted to pass a screw 86 carried on a hand wheel 87 provided with a handle 88 for rotating the same. On the wheel 87 there is provided a series of notches 89 to receive a tooth 90 on a hand lever 91 carried by a pivot 92 on a fixed bracket 93 adapted to be secured by screws 94 to any fixed support in the cab. Also on the fixed support 93 there may be provided a dial plate 95, secured by screws 96, having a pointer shaft 97 provided with a rotatable pointer 98 held in place, by a screw 99, on a split end 100 on said pointer 98. The shaft 97 extends inwardly through the bracket 93, where it is provided with a gear 101 for cooperating with a line gear 102 fastened on the block 85. The line gear 102 meshes with the side of the gear 85 so that the position of the handle 88 is registered by the position of the pointer 98 on the dial 95.

When it is desired to operate the locomotive reverse gear or other hydraulic device forwardly, the hand lever 1 is moved to the right, thereupon withdrawing liquid from the pipe 79 in coordination with the travel of any desired device to be moved thereby. Furthermore, upon the extreme forward movement of the hand lever 1, the hand lever 1 and the said device will be brought into phase each time by the opening of the valve 52, 53, due to the contact of the screw end 15 with the valve rod 16 and the readjustment in the system of the hydraulic liquid or oil received from the reservoir 66 under the influence of the compressed air supplied through the pipe 71, resulting in passing compensating liquid from the reservoir 66 to the system or in the opposite direction, according to the expansion or contraction of the liquid. When the locomotive or other device is to be driven in the other direction, the hand lever 1 is moved to the left of the middle position shown in Fig. 1, whereupon the liquid in the master cylinder 21 will be pressed forwardly, while the spring 36 is compressed somewhat to avoid undue acceleration. Also, it will be noted that by this movement, the travel of the hydraulic device being moved and the hand lever 1 is coordinated in the same way. Thus, in either direction of drive, the operator will know the extent of movement of said device by the position of the hand lever and is enabled, accordingly, to control the forward or rearward movement thereof with the greatest degree of precision. Also, the operation of the device in this way will be accomplished with the utmost smoothness and with a minimum amount of effort.

In the operation of the modified form of master cylinder shown in Figs. 3 to 5, the control of the reverse gear mechanism is carried out in the same way as previously described. However, in this instance, the said control is brought about by the movement of the handle 88 on the hand wheel 87 after the toothed lever 91 has been lifted out of engagement with the locking recesses 89. The rotation of the hand wheel 87 from its middle position forwardly or rearwardly will bring about the forward or rearward drive of the locomotive or other device, as desired, and the degree of advance forwardly or rearwardly of the hand wheel 87 will always be coordinated in travel to the position given to the device to be moved to perform work and which will be shown at all times by the pointer 98 on the dial 95.

While I have described my invention above in detail, I wish it to be understood that many changes may be made therein without departing from the spirit of the same.

I claim:

1. A master cylinder, having a reciprocable cylinder provided with a yieldable support for said cylinder, a piston therein, manual means for operating the piston, an outlet connected to the cylinder, a reservoir, a connection from the reservoir to the cylinder having a liquid compensation valve therein, and a valve operating member on the manual means constructed to operate the valve by the movement of the manual means so as to compensate the liquid through the valve.

2. A master cylinder, having a pivotally mounted reciprocable cylinder provided with a yieldable support for said cylinder, a piston therein, manually pivoted means for operating the piston, an outlet connected to the cylinder having a liquid compensation valve therein, and a valve operating member on the manual means, normally out of contact with said valve, constructed to operate the valve by the movement of the manual means so as to compensate the liquid through the valve, said yieldable support comprising a compressible spring.

3. A master cylinder, having a reciprocable cylinder, provided with a yieldable support for said cylinder, a piston therein, manual means for operating the piston, an outlet connected to the cylinder, a reservoir, a connection from the reservoir to the cylinder having a liquid compensation valve therein, and a valve operating member on the manual means constructed to operate the valve at the end of the path of movement of the manual means so as to compensate the liquid through the valve, said yieldable support comprising a compressible spring and a fixed support for said spring.

4. A master cylinder, having a pivotally mounted reciprocable cylinder, provided with a yieldable support for said cylinder, a piston therein, manually pivoted means for operating the piston, an outlet connected to the cylinder, a reservoir, a connection from the reservoir to the cylinder having a liquid compensation valve therein, and a valve operating member on the manual means, normally out of contact with said valve, constructed to operate the valve at the end of the path of movement of the manual means so as to compensate the liquid through the valve, said yieldable support comprising a compressible spring, a fixed support for the spring and a rod connecting the spring to the cylinder.

5. A master cylinder, having a cylinder, a support to which it is attached, a piston therein, manual means for operating the piston, an outlet connected to the cylinder, a reservoir, a connection from the reservoir to the cylinder having a liquid compensation valve therein, a valve operating member on the manual means constructed to operate the valve by the movement of the manual means so as to compensate the liquid through the valve, and a spring connected between the cylinder of the master cylinder and its support and the other side of the support from the cylinder constructed to yield after the piston is moved in case of excess pressure in the cylinder.

6. A master cylinder, having a pivotally mounted reciprocable cylinder, a support to which it is attached, a piston therein, manually pivoted means for operating the piston, an outlet connected to the cylinder having a liquid compensation valve therein, a valve operating member on the manual means, normally out of contact with said valve, constructed to operate the valve by the movement of the manual means so as to compensate the liquid through the valve, and a spring connected between the cylinder of the master cylinder and its support constructed to yield after the piston is moved in case of excess pressure in the cylinder.

7. A master cylinder, having a cylinder, a support to which it is attached, a piston therein, manual means for operating the piston, an outlet connected to the cylinder, a reservoir, a connection from the reservoir to the cylinder having a liquid compensation valve therein, a valve operating member on the manual means constructed to operate the valve at the end of the path of movement of the manual means so as to compensate the liquid through the valve, and a spring connected between the cylinder of the master cylinder and its support on the other side of the support from the cylinder constructed to yield after the piston is moved in case of excess pressure in the cylinder.

8. A master cylinder, having a pivotally mounted reciprocable cylinder, a support to which it is attached, a piston therein, manually pivoted means for operating the piston, an outlet connected to the cylinder, a reservoir, a connection from the reservoir to the cylinder having a liquid compensation valve therein, a valve operating member on the manual means, normally out of contact with said valve, constructed to operate the valve at the end of the path of movement of the manual means so as to compensate the liquid through the valve, and a spring connected between the cylinder of the master cylinder and its support constructed to yield after the piston is moved in case of excess pressure in the cylinder.

EDWARD A. ROCKWELL.

REFERENCES CITED

The following references are of record in the file of this patent:

UNITED STATES PATENTS

| Number | Name | Date |
|---|---|---|
| 832,657 | Dorn | Oct. 9, 1906 |
| 1,023,995 | Cole | Apr. 23, 1912 |
| 1,144,455 | Austin | June 29, 1915 |
| 1,430,746 | Loughead | Oct. 3, 1922 |
| 1,687,720 | Garner | Oct. 16, 1928 |
| 1,786,856 | Madden | Dec. 30, 1930 |
| 1,821,404 | Rapellin | Sept. 1, 1931 |
| 1,841,696 | Andres | Jan. 19, 1932 |
| 2,115,174 | Majneri | Apr. 26, 1938 |
| 2,120,073 | Majneri | June 7, 1938 |
| 2,258,257 | Main | Oct. 7, 1941 |
| 2,281,330 | Sinclair | Apr. 28, 1942 |
| 2,344,473 | Stevenson | Mar. 14, 1944 |